United States Patent [19]

Brace et al.

[11] Patent Number: 4,867,085
[45] Date of Patent: Sep. 19, 1989

[54] THREE DIMENSIONAL STABILIZATION OF DRY COMPOSITE FABRIC

[75] Inventors: Michael W. Brace, Huntington; Rance B. Fox, Milford; Marilyn Michel, Seymour, all of Conn.

[73] Assignee: United Technologies Corporation, Hartford, Conn.

[21] Appl. No.: 239,824

[22] Filed: Sep. 2, 1988

[51] Int. Cl.[4] .................. D05B 21/00; D05B 97/00
[52] U.S. Cl. ........................ 112/262.1; 112/121.12
[58] Field of Search ................ 112/121.15, 121.12, 112/121.11, 121.24, 262.1, 121.28, 2.1, 2

[56] References Cited

U.S. PATENT DOCUMENTS

| | | | |
|---|---|---|---|
| 639,928 | 12/1899 | Muth | 112/121.12 |
| 688,961 | 12/1904 | McDonald | 112/121.12 |
| 1,251,677 | 1/1918 | McDonald | 112/121.12 |
| 1,577,649 | 3/1926 | Mark | 112/121.24 |
| 2,355,023 | 8/1944 | Wiren | 112/121.12 |
| 2,976,827 | 3/1961 | Bauder, Jr. | 112/121.28 |
| 3,151,584 | 10/1964 | Fossa | 112/121.28 |
| 3,172,379 | 3/1965 | Light . | |
| 4,608,939 | 9/1986 | Lampley . | |

FOREIGN PATENT DOCUMENTS

| | | | |
|---|---|---|---|
| 658439 | 10/1951 | United Kingdom | 112/121.15 |
| 1321074 | 6/1973 | United Kingdom | 112/121.15 |

Primary Examiner—H. Hampton Hunter

[57] ABSTRACT

A method for fabricating and stabilizing three dimensional composite fabric preforms. The method comprises disposing a plurality of fabric plies between upper and lower templates that have substantially the desired preform shape and openings in at least two planes. The fabric plies are joined through the template openings and the templates are removed from the preform. These stabilized preforms maintain tighter tolerances.

6 Claims, 1 Drawing Sheet

THREE DIMENSIONAL STABILIZATION OF DRY COMPOSITE FABRIC

DESCRIPTION

1. Technical Field

The field of art to which this invention pertains is composites, particularly composite preforms and methods for making the same.

2. Background Art

Composite components have become commonplace in the aerospace industry. Because of their widespread use, there is continuing investigation and research into methods for making composite parts. One common method of making composites is resin transfer molding. In resin transfer molding, dry composite fabric having the desired part shape is placed in a mold. Resin is then injected into the mold to "wet" the fabric. The temperature is increased to cure the resin and form the composite. To facilitate mass production of composite parts using resin transfer molding, it is advantageous to have a method for making and storing the dry composite fabric shapes (e.g., preform).

Present methods for making two dimensional composite preforms typically comprise stitching or tacking (e.g., melting a thermoplastic) the dry conventionally woven fabric plies together to maintain alignment and stabilize the fabric edge from fraying. The preform is then cut along its periphery to the desired shape.

Three dimensional preforms are more difficult to fabricate and stabilize. It is possible to make a multilayer bed of fabric conform to virtually any three dimensional shape without any cuts, splices, folds or darts in the fabric. This is only possible due to the slippery nature of the fiber bundles themselves and, more importantly, to the weave of the fabric. The more complex and defined a shape, the looser the weave must be. However, if the loose weave fabrics are cut in any fashion, they typically fray and self-destruct with handling. Thus, although large, oversized, layers of fabric can be made to conform to a three-dimensional shape, it typically does not maintain that shape and dimensionality with any amount of handling.

Typically, the fabric is formed one layer at a time on production mold (using up mold time) and made oversized due to the lack of edge stabilization and dimensionality. This also results in a subsequent trimming/machining operation after the part is injected and cured within a resin matrix.

One common method for overcoming the three dimensional composite preforms production problems (with the fabric/weaves typically used) employs a thermoplastic polymer adhesive between the dry fabric plies to effect a loose bond. Typically, the dry fabric is coated with a thin layer of the thermoplastic polymer or alternately a fibrous polymer sheet is placed between the laminates. The three dimensional preform is contoured, and stabilized by melting and refreezing the polymer by applying and removing a hot iron for each layer of the preform assembly. This technique is extremely labor intensive and necessarily introduces a contaminant, that can result in voids, (e.g., the thermoplastic) into the composite.

Accordingly, there has been a continual search for new methods of stabilizing the edges and shapes of composite preforms.

DISCLOSURE OF INVENTION

This invention is directed to a method for fabricating and stabilizing three dimensional composite fabric preforms. The method comprises disposing a plurality of fabric plies between upper and lower templates that have substantially the desired preform shape and openings in at least two planes. The fabric plies are joined through the template openings and the templates are removed from the preform. These stabilized preforms maintain tighter tolerances.

The foregoing and other objects, features and advantages will be apparent from the specification, claims and from the accompanying drawings which will illustrate an embodiment of the invention.

BEST MODE FOR CARRYING OUT THE INVENTION

Figure 1:
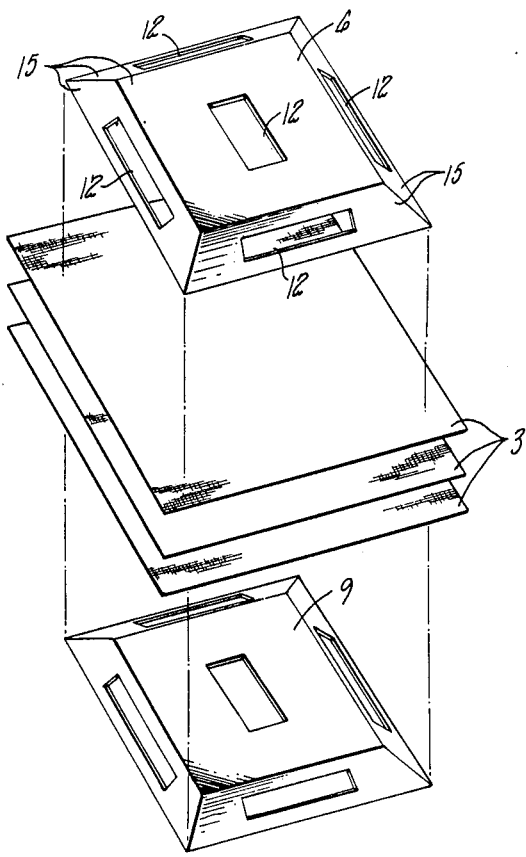
FIG. 1 is an exploded perspective view of the template-preform assembly of this invention prior to assembly.

According to FIG. 1, a plurality of composite fabric plies 3 are disposed between upper template 6 and lower template 9. Upper and lower templates 6, have substantially the same shape as the desired end product, the preform. Typically, this is also the same shape as the ultimate composite component. However, they may vary in shape particularly when there is a difference in the inner mold line (IML) and outer mold line (OML) of the part. Both templates also have openings 12 in faces 15.

Figure 2:
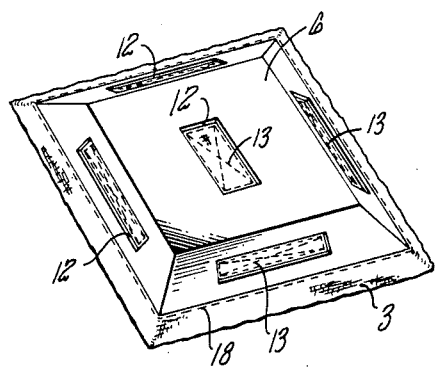
FIG. 2 is a perspective view of the fully assembled template-preform assembly of this invention.

FIG. 2 depicts the fully assembled template and preform. The plies 3 conform to the shape of the templates 6, 9. Typically, the templates 6, 9 have openings 12 that are in register since they are used as access areas through which the fabric plies 3 may be joined together, for example, by stitching 13. The amount, size and position of the openings 12 are sufficient that when the plies 3 are stitched together through the openings 12 and the templates 6, 9 are removed, the plies 3 retain their desired shape. Preferably, each template face 15 (e.g., plane) has at least one opening 12, although depending on the three dimensional shape that may not be necessary. This invention is particularly advantageous for three dimensional shapes having at least two planes. This invention is especially advantageous for three dimensional shapes having four or more faces (e.g., planes). Generally, a preform retains its three dimensional shape better when there are more template faces 15 that have openings 12 and/or when there are more openings 12 in general since there will be more stitching 13. However, the quantity of stitching 13 is balanced against the labor required to perform the stitching 13. In addition, depending on the type of stitching 13 used, the stitching 13 may be as a contaminant to the final composite component since the stitching 13 is not removed. Alternatively, the stitching 13 may provide additional strength to the composite when, for example, a high strength fiber such as KEVLAR ™ polyamide fiber (E.I. DuPont DeNemours, Wilmington, Del.) or fiberglass is used for the stitching 13. The plies 3 are typically trimmed while in the templates to provide a net shape along the periphery of the templates 6, 9. In addition, the plies 3 may be stitched 18 around the periphery of the templates 6, 9 to stabilize the edge from fraying etc. The templates 6, 9 may be used as guides during this periphery trimming and stitching process.

Figure 3:
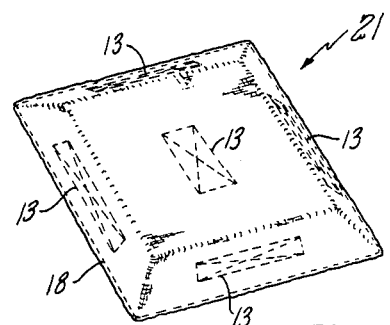
FIG. 3 is a perspective view of the stabilized preform of this invention.

FIG. 3 displays the preform 21 trimmed and shaped without the templates. The stitching 13 holds the preform in shape. Stitching the preform 21 while it is preform in shape. The stitching 18 while in between the templates stabilizes the edge and aids in maintaining the preform shape.

This method can be used with a variety of composite fabric ply 3 materials. Exemplary fiber materials include graphite, aramid, fiberglass or any combination thereof. The materials are typically dry fiber, however, they may be impregnated with a resin (e.g., epoxy or polyester). A variety of materials may be used for the templates. Typically, plastic molds are strong yet light weight and can be easily fabricated in the desired shape. Other exemplary template materials include composite (fiber/resin), metal, acrylic, and fiberboard.

This invention provides a method for fabricating and stabilizing three dimensional shape composite preforms. Typically, now a preform can be stabilized to maintain 0.030 inch tolerances compared to the 0.125 inch tolerances that could be maintained in the past. The preform can be trimmed to the net shape and the edges can be stabilized from edge effects such as fraying and falling out of dimensional tolerances. In addition, high dimensionally toleranced parts can be preformed and injected with resin to come out of the mold net. This eliminates further trim and machine operations. The mass production of preforms can be completely separated from the molding and final part production, removing any geographic constraints for each operation.

Although the invention has been shown and described with respect to detailed embodiments, it should be understood by those skilled in the art that various changes and omissions in form and detail may be made therein without departing from the spirit or scope of this invention.

We claim:

1. A method for fabricating and stabilizing three dimensional composite fabric preforms comprising:
    a. disposing a plurality of fabric plies between upper and lower templates, said templates having substantially the desired preform shape and having openings in at least two planes;
    b. compressing said fabric plies together into said preform shape by telescopically fitting one of said templates into the other template;
    c. joining the fabric plies through said template openings; and
    d. removing said templates from said preform.

2. The method as recited in claim 1 wherein said plies are stitched around at least a portion of the periphery of said templates.

3. The method as recited in claim 2 wherein said plies are trimmed along at least a portion of the periphery.

4. The method as recited in claim 3 wherein said templates are used as a trimming guide.

5. The method as recited in claim 4 wherein said plies are edge treated to prevent edge effects.

6. The method as recited in claim 5 wherein said plies are edge treated while disposed between said upper and lower templates.

* * * * *

UNITED STATES PATENT AND TRADEMARK OFFICE
CERTIFICATE OF CORRECTION

PATENT NO. : 4,867,085

DATED : September 19, 1989

INVENTOR(S) : Michael W. Brace, Rance B. Fox, Marilyn Michel

It is certified that error appears in the above-identified patent and that said Letters Patent is hereby corrected as shown below:

Column 2, line 30, after "templates 6," insert --9--.

Signed and Sealed this

Twenty-first Day of August, 1990

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,867,085

DATED : September 19, 1989

INVENTOR(S) : Michael W. Brace, Et Al

It is certified that error appears in the above-identified patent and that said Letters Patent is hereby corrected as shown below:

Column 3, lines 8-9, delete "preform in shape. The", and insert
--around the periphery of the templates 6,
9 with--.

Signed and Sealed this

Sixteenth Day of November, 1993

Attest:

BRUCE LEHMAN

Attesting Officer

Commissioner of Patents and Trademarks